D. Stearns,
Water Wheel.

N° 3,271. Patented Sep. 14, 1843.

2 Sheets—Sheet 2.
D. Stearns,
Water Wheel.
Nº 3,271. Patented Sep. 14, 1843.
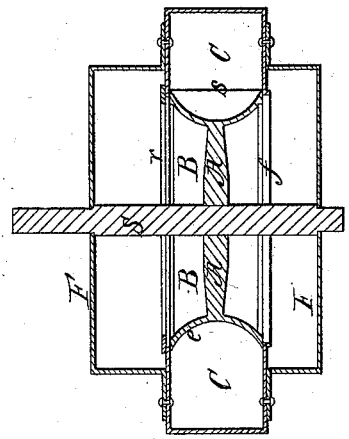
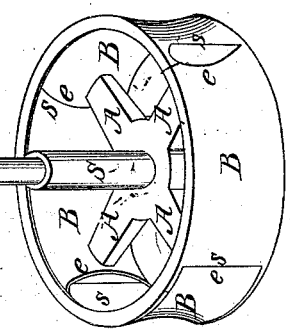
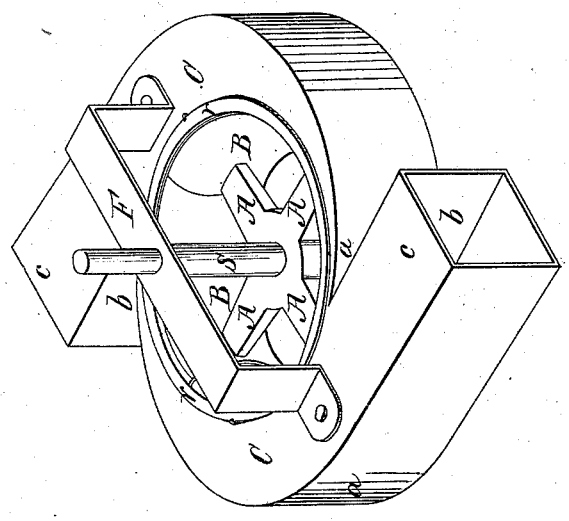

UNITED STATES PATENT OFFICE.

DANIEL STEARNS, OF ROME, NEW YORK.

IMPROVEMENT IN WATER-WHEELS.

Specification forming part of Letters Patent No. 3,271, dated September 14, 1843.

*To all whom it may concern:*

Be it known that I, DANIEL STEARNS, of the town of Rome, in the county of Oneida and State of New York, have invented a new and useful Improvement in Water-Wheels; and I do hereby declare that the following is a full, clear, and exact description of the construction and operation of same, reference being had to the annexed drawings, making a part of this specification, in which—

Figure 2:
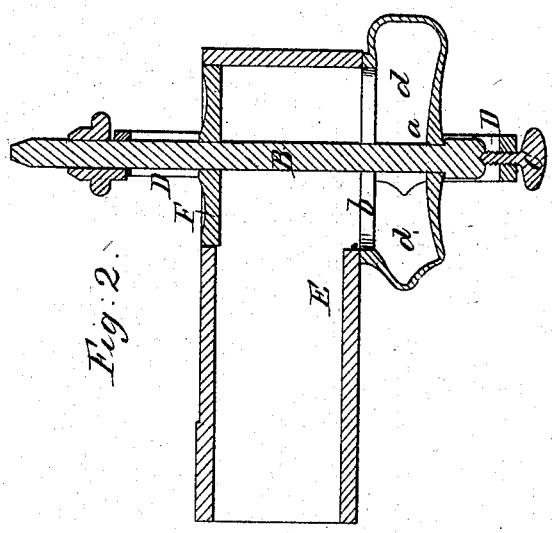
Figure 1:
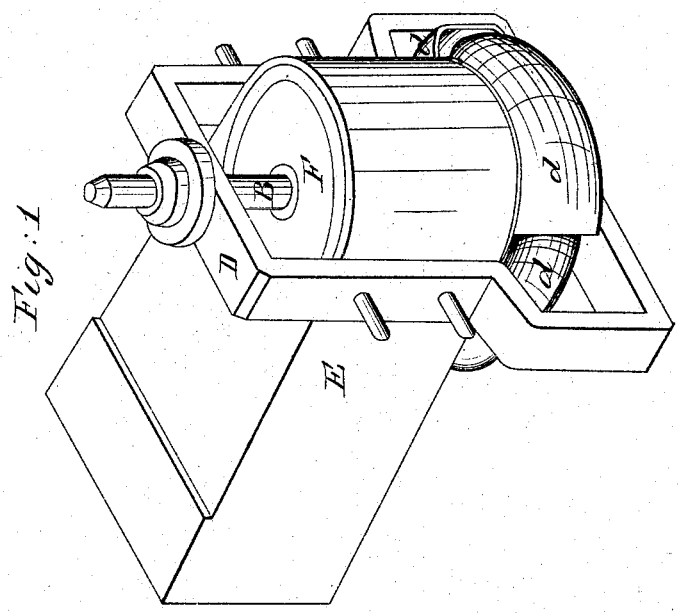

Figure 1 is an isometrical projection of the wheel with its immediate appendages complete. Fig. 2 is a vertical longitudinal section of the same, and Fig. 3 is an isometrical projection of a wheel with square buckets.

The main body of the wheel A resembles in form the section of a cylinder closed at the bottom, the upper surface of the bottom plate $a$ being more or less convex, so as to cause the water to flow freely toward the rim $b$, and through the perforations $c$ to act upon the inclined planes of the buckets $d$. The rim $b$ is vertically fastened to the circumference of the bottom plate $a$ and on its upper edge, and is from one-third to one-half of the diameter of said bottom plate in height. The rim has three or more perforations $c$ of an oblong wedge form; or, in other words, the upper and lower edges of these perforations incline toward each other, so as to make the narrower ends about one-half the width of the wider ones, which latter are nearly as wide as the height of the rim. The vertical line of the narrow end of each bucket coincides nearly with the vertical line of the wider end of the next or adjoining bucket, and vice versa. The buckets $d$ (see Fig. 3) are constructed of three sides, each in form corresponding to that of the perforations which they are to cover, and through which latter the water is admitted to them from the main body of the wheel, the buckets thus formed presenting three inclined planes to the action of the water which causes the wheel to revolve.

Figure 3:
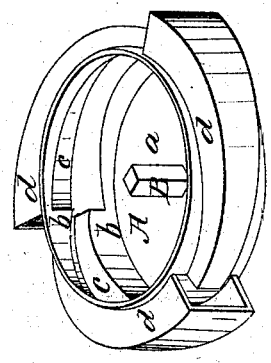

The buckets, instead of being sectionally square or oblong, as above described, and represented in Fig. 3, may be of an oval or elliptical, as shown in Figs. 1 and 2, or any other form if only the same principle is retained.

Vertically and through the center of the wheel runs the shaft B, which has a shoulder near its lower extremity, on which the wheel rests. By means of the adjusting-screw C on the under side of the frame D the wheel is raised or lowered to or from the under side of the circular opening in the bottom and at one end of the conductor E, through the which water gets access to the wheel. This conductor is of a square form, its sides closing at the wheel end semicircularly and having a circular opening at top and bottom, the latter corresponding with the opening of the wheel, the former to admit the drum or circular plate F, fastened near the upper end of the shaft B, which fits and revolves in it for the purpose of keeping the wheel steady and giving it a more uniform motion. From the shaft motion is communicated to any kind of machinery by any of well-known mechanical contrivances, such as pulley, bands, cog-wheels, &c.

The wheel may be constructed of cast-iron or any other suitable material. The whole is set in and fastened to an appropriate framework.

Operation: The water is admitted through the conductor E to the main body of the wheel A, thence through the perforations $c$ to the buckets $d$, causing by its pressure against the three inclined planes which form said buckets the revolution of the wheel, the water escaping at the apertures at the ends of the buckets.

What I claim as my invention, and desire to secure by Letters Patent, is—

The wheel with three or more buckets, each presenting three inclined sides, constructed and arranged as herein set forth, to the action of the water, the sectional shape of said buckets being either square, oblong, oval, elliptical, or otherwise, so as that the principle remains the same.

DANIEL STEARNS.

Witnesses:
WM. S. PARKHURST,
ALMER SPINNING.